United States Patent
Nakayama

(10) Patent No.: US 12,421,772 B2
(45) Date of Patent: Sep. 23, 2025

(54) VEHICLE

(71) Applicant: TOYOTA JIDOSHA KABUSHIKI KAISHA, Toyota (JP)

(72) Inventor: Shu Nakayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 18/455,204

(22) Filed: Aug. 24, 2023

(65) Prior Publication Data

US 2024/0151076 A1    May 9, 2024

(30) Foreign Application Priority Data

Nov. 4, 2022   (JP) ................................. 2022-177428

(51) Int. Cl.
| | |
|---|---|
| H02J 7/34 | (2006.01) |
| B60R 16/033 | (2006.01) |
| E05B 81/04 | (2014.01) |
| E05B 81/86 | (2014.01) |
| H02J 7/00 | (2006.01) |

(52) U.S. Cl.
CPC ............ E05B 81/86 (2013.01); B60R 16/033 (2013.01); E05B 81/04 (2013.01); H02J 7/0063 (2013.01); H02J 7/345 (2013.01)

(58) Field of Classification Search
CPC .......... E05B 81/86; E05B 81/04; E05B 81/54; B60R 16/033; B60R 16/03; B60R 25/40; H02J 7/0063; H02J 7/345; H02J 9/068; H02J 2207/20
See application file for complete search history.

(56) References Cited

U.S. PATENT DOCUMENTS

| | | | | |
|---|---|---|---|---|
| 2008/0129477 A1* | 6/2008 | Takahashi | ........... | B60C 23/0433 340/5.21 |
| 2009/0033294 A1* | 2/2009 | Odajima | ............... | H02J 7/1415 903/903 |
| 2021/0009102 A1 | 1/2021 | Nakayama | | |
| 2023/0216437 A1* | 7/2023 | Tsukamoto | ....... | H02M 7/53871 307/9.1 |

FOREIGN PATENT DOCUMENTS

| | | |
|---|---|---|
| JP | 2007-159280 A | 6/2007 |
| JP | 2007-252082 A | 9/2007 |
| JP | 2008-072839 A | 3/2008 |
| JP | 2014-136560 A | 7/2014 |
| JP | 2021-014173 A | 2/2021 |
| WO | 2021/240190 A1 | 12/2021 |

* cited by examiner

*Primary Examiner* — Lincoln D Donovan
*Assistant Examiner* — Alex W Lam
(74) *Attorney, Agent, or Firm* — SoraIP, Inc.

(57) ABSTRACT

A control device for an in-vehicle power supply system, comprising: a main power supply that supplies electric power to a load mounted on a vehicle; a redundant power supply that includes a capacitor for storing electric power and supplies electric power from the capacitor to the load when the main power supply fails; and a relay that switches the power supply source to the load to either the main power supply or the redundant power supply, wherein after the ignition of the vehicle is turned off, the discharge process of the capacitor is started, and the fixation prevention process of the relay using the electric power of the capacitor is executed during the discharging process of the capacitor.

1 Claim, 3 Drawing Sheets

PROCESSING TIME OF
THE PRESENT INVENTION

PRIOR ART PROCESSING TIME

VEHICLE

CROSS-REFERENCE TO RELATED APPLICATION

This application claims priority to Japanese Patent Application No. 2022-177428 filed on Nov. 4, 2022, incorporated herein by reference in its entirety.

BACKGROUND

1. Technical Field

The present disclosure relates to a control device mounted on a vehicle.

2. Description of Related Art

Japanese Unexamined Patent Application Publication No. 2021-014173 (JP 2021-014173 A) discloses a control device provided with a first power supply system that supplies power to an electric brake device (load) mounted on a vehicle and a second power supply system that supplies power from the capacitor to the electric brake device via a relay when the first power supply system fails.

SUMMARY

In the control device described in JP 2021-014173 A, after the ignition of the vehicle is turned off, a discharge process that connects the capacitor to the ground is performed, and power (charge) of the capacitor is not effectively utilized. Therefore, there is room for studying a method of effectively utilizing the power of the capacitor after the ignition of the vehicle is turned off.

The present disclosure has been made in view of the above issue, and an object thereof is to provide a control device capable of effectively utilizing power discharged from a capacitor after ignition of a vehicle is turned off.

In order to solve the above issue, an aspect of the technique of the present disclosure is a control device for an in-vehicle power supply system, and the control device includes: a main power supply that supplies power to a load mounted on a vehicle; a redundant power supply that includes a capacitor for storing power, and supplies power to the load from the capacitor when the main power supply fails; and a relay that switches a power supply source to the load to any of the main power supply and the redundant power supply. A discharge process is started after ignition of the vehicle is turned off, and a fixation prevention process of the relay using power from the capacitor is executed while the discharge process of the capacitor is executed.

According to the control device of the present disclosure, the discharge process of the capacitor and the fixation prevention process of the relay using the power of the capacitor are executed in parallel after the ignition of the vehicle is turned off, whereby the power discharged from the capacitor can be effectively utilized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When the ignition of the vehicle is turned off, the control device of the present disclosure starts the discharge process of the capacitor after first performing the failure diagnostics of the redundant power supply. Then, during the period in which the discharge process of the capacitor is performed, the control device performs the fixation prevention process of the relay that switchably connects the load and each power source (main power supply and redundant power supply) in parallel. As a result, electric power (electric charge) discharged from the capacitor can be effectively utilized, and time until the discharge of the capacitor is completed can be shortened.

Hereinafter, an embodiment of the present disclosure will be described in detail with reference to the drawings.

EMBODIMENT

Configuration

Figure 1:
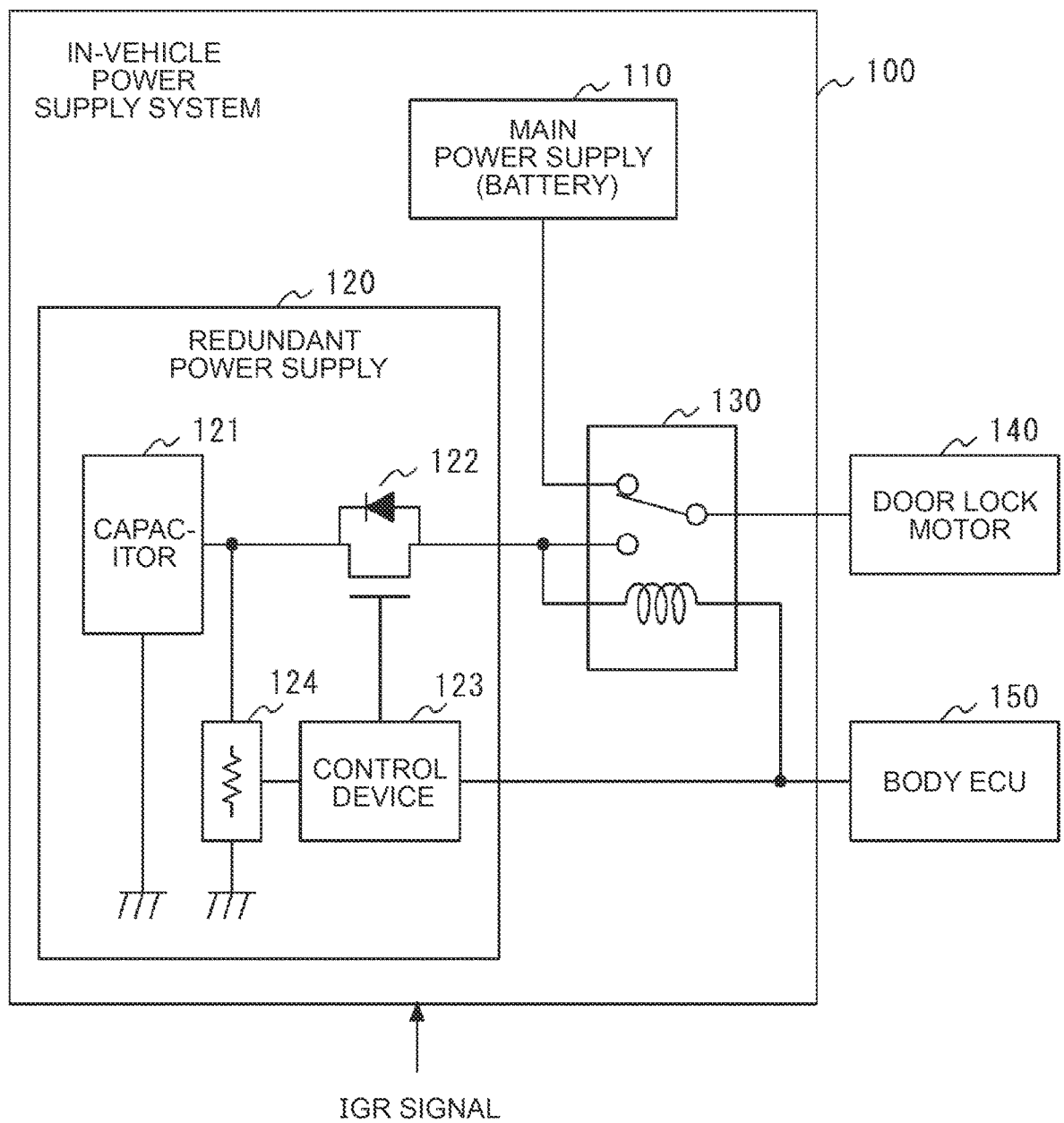
FIG. 1 is a functional block diagram of an in-vehicle power supply system including a control device according to an embodiment of the present disclosure and a peripheral portion thereof.

FIG. 1 is a functional block diagram of an in-vehicle power supply system 100 including a control device 123 according to an embodiment of the present disclosure and a peripheral portion thereof. The functional block illustrated in FIG. 1 includes an in-vehicle power supply system 100 including a main power supply 110, a redundant power supply 120, and a mechanical relay 130, a door lock motor 140, and a body ECU 150.

The main power supply 110 is configured to supply electric power to a load such as the door lock motor 140 mounted on the vehicle. As the main power supply 110, for example, a secondary battery configured to be chargeable and dischargeable, such as a lead battery, is used. The main power supply 110 is connected to the door lock motor 140 via a mechanical relay 130.

The redundant power supply 120 is a sub power supply configured redundantly with respect to the main power supply 110, and is configured to back up and supply power to a load such as the door lock motor 140 mounted on the vehicle when the main power supply 110 fails. The redundant power supply 120 is a system including a capacitor 121, a semiconductor relay 122, a control device 123, and a discharge circuit 124.

The capacitor 121 is a power storage element (capacitor for power storage) for storing backup power, which is power supplied to an in-vehicle device requiring a redundant power supply configuration such as the door lock motor 140 when the main power supply 110 fails.

Semiconductor relay 122 is inserted between capacitor 121 and mechanical relay 130, and is a configuration (BACT relay) for switching the electrically conductive/disconnectable state based on an instruction from control device 123. For example, Metal Oxide Semiconductor Field Effect Transistor (MOSFET) or the like can be used for the semiconductor-relay 122.

The discharge circuit 124 is configured to discharge the electric power (electric charge) stored in the capacitor 121 based on an instruction from the control device 123. A resistive element or the like is used for the discharge circuit 124.

The control device 123 is configured to perform control for switching the state of the electric conduction/interruption of the semiconductor relay 122 and control for switching the state of the discharge/non-discharge of the discharge circuit 124 based on the state of IGR signal and the request signal from the body ECU 150. IGR signal is a signal indicating a condition (IG-ON or IG-OFF) of the ignition of the vehicle, and the in-vehicle power supply system 100 is inputted from a predetermined in-vehicle device. The control device 123 is constituted by, for example, a microcomputer. In addition, the control device 123 can perform failure diagnostics of the redundant power supply 120. More specifically, the control device 123 can check the malfunction of the semiconductor relay 122, the malfunction of the discharge circuit 124, and the like in the failure diagnostics of the redundant power supply 120. Furthermore, the control device 123 can perform a fixation prevention process of the mechanical relay 130. More specifically, the control device 123 can perform conduction for preventing the mechanical relay 130 from being stuck to the contact in the fixation prevention process of the mechanical relay 130.

The mechanical relay 130 is provided by being inserted between the main power supply 110 and the redundant power supply 120 and the door lock motor 140, and is configured to control a state of power supply from the main power supply 110 and the redundant power supply 120 to the door lock motor 140. The mechanical relay 130 is inserted between the main power supply 110 and the redundant power supply 120 and the door lock motor 140. The mechanical relay 130 may be, for example, a single-pole double-throw exciting mechanical relay. The mechanical relay 130 can switch between a connection state in which the coil operates based on the control of the body ECU 150 and power can be supplied from the main power supply 110 to the door lock motor 140 (hereinafter referred to as a "first connection state") and a connection state in which power can be supplied from the redundant power supply 120 to the door lock motor 140 (hereinafter referred to as a "second connection state").

The door lock motor 140 is a motor actuator for locking a door of a vehicle. The door lock motor 140 is driven by electric power supplied through the mechanical relay 130, and the vehicle door can be locked by the driving. As a mechanism for locking the vehicle door, in addition to the door lock motor 140, there is an electric latch mechanism (E latch) that does not require power switching by the mechanical relay 130.

The body ECU 150 is one of Electronic Control Unit (ECU) which are devices mounted on vehicles. The body ECU 150 is configured to be capable of performing control for switching the connected status of the power supply source of the mechanical relay 130. When the connection state of the mechanical relay 130 is switched from the redundant power supply 120 to the connection state (second connection state) in which power can be supplied to the door lock motor 140, the body ECU 150 outputs a door unlock request (signal) to the control device 123 of the redundant power supply 120. At this time, the body ECU 150 can provide a requirement for cleaning the contacts of the mechanical relays 130 to the control device 123 of the redundant power supply 120. Note that the control performed by the body ECU 150 may be performed by another ECU mounted on the vehicles.

Control

Figure 2:
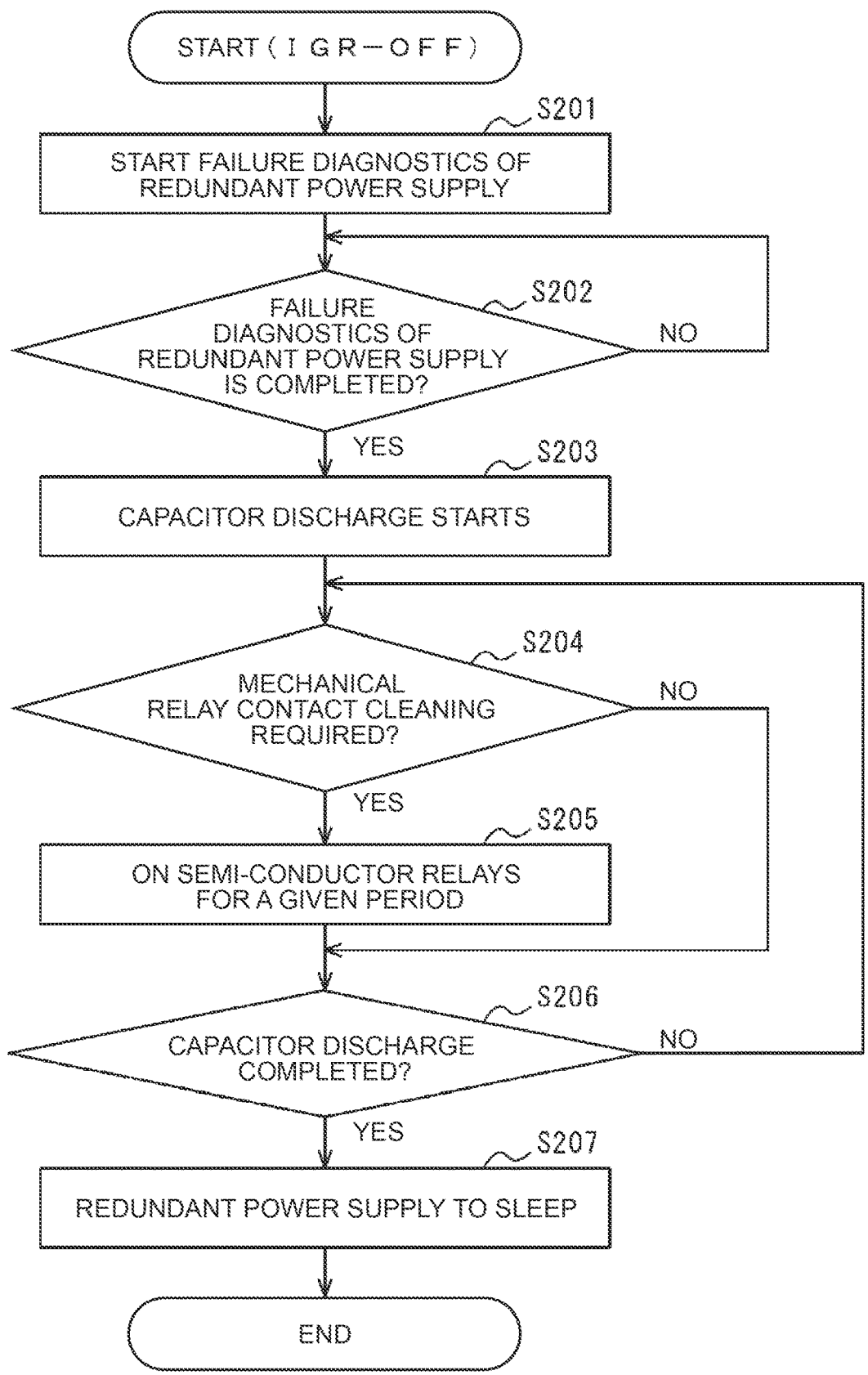
FIG. 2 is a flow chart showing a process of power supply control after IGR-OFF executed by a control device.
Figure 3A:
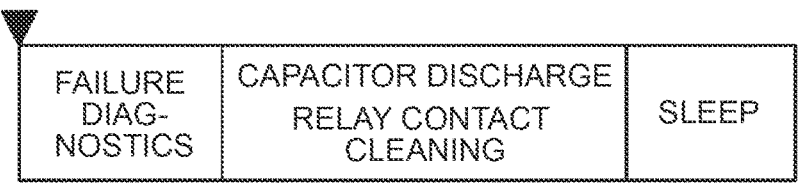
FIG. 3A illustrates a process of controlling the power supply according to the present disclosure.
Figure 3B:
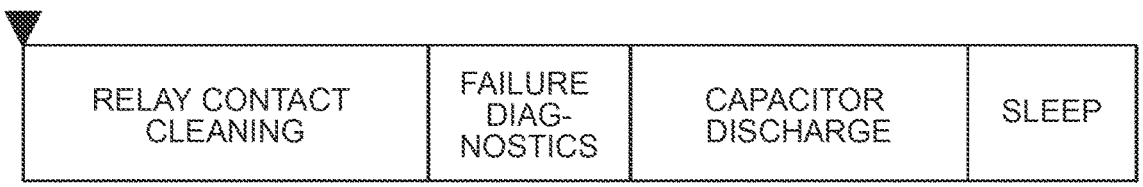
FIG. 3B illustrates a process of controlling the power supply according to the present disclosure.

Next, referring further to FIGS. 2, 3A, and 3B, the control executed by the in-vehicle power supply system 100 of the present embodiment will be described. FIG. 2 is a flow chart showing a process sequence of power supply control after IGR-OFF executed by the control device 123. FIGS. 3A and 3B are diagrams for explaining a difference in a process between the power supply control of the present disclosure and the power supply control of the prior art.

The power supply control illustrated in FIG. 2 is started when the in-vehicle power supply system 100 receives an IGR signal (IGR-OFF) indicating that the ignition of the vehicle has been turned off.

S201

The control device 123 starts failure diagnostics of the redundant power supply 120. Well-known techniques can be used for this failure diagnostics. When the failure diagnostics of the redundant power supply 120 is started by the control device 123, the process proceeds to S202.

S202

The control device 123 determines whether or not the failure diagnostics of the redundant power supply 120 has been completed. When the control device 123 determines that the failure diagnostics of the redundant power supply 120 has been completed (S202, Yes), the process proceeds to S203.

S203

The control device 123 switches the discharge circuit 124 to the discharge state, and starts control for discharging the electric power (charge) of the capacitor 121. When the control device 123 starts discharging the capacitor 121, the process proceeds to S204.

S204

The control device 123 determines, from the body ECU 150, whether there is a need to clean the contacts of the mechanical relays 130. The cleaning of the contact point of the mechanical relay 130 is a process of removing a thin film of foreign matter or the like adhering to the surface of the contact point by incinerating the thin film by applying a current to the contact point. When the control device 123 determines that the contact cleaning of the mechanical relay 130 is required (S204, Yes), the process proceeds to S205. On the other hand, when the control device 123 determines that the contact cleaning of the mechanical relay 130 is not required (S204, No), the process proceeds to S206.

S205

The control device 123 controls the semiconductor-relay 122 to be in a conductive state (ON) for a predetermined period. By this control, a current can be supplied to the contact point of the mechanical relay 130 for cleaning, together with the control of switching of the second connected state of the mechanical relay 130 by the body ECU 150. The predetermined time can be arbitrarily set based on the time required for the occupant of the vehicle to get off the vehicle and lock the door of the vehicle (for example, 4 minutes), while taking into consideration the time required to burn and remove the thin film caused by foreign matters adhering to the surface of the contact point. When the control device 123 turns the relay 122 ON for a predetermined period of time, the process proceeds to S206.

S206

The control device 123 determines whether or not the discharging of the capacitor 121 is completed. The completion of the discharge can be determined when the voltage of the capacitor 121 becomes equal to or lower than a predetermined value. When the control device 123 determines that discharging of the capacitor 121 is completed (S206, Yes), the process proceeds to S207. On the other hand, when the control device 123 determines that discharging of the capacitor 121 is not completed (S206, No), the process proceeds to S204.

S207

The control device 123 transitions the function of the redundant power supply 120 to a predetermined sleep state. When the control device 123 shifts the redundant power supply 120 to the sleep state, this power supply control ends.

By the above-described control, the discharge power of the capacitor 121 is not simply discarded, but can be used for the contact cleaning of the mechanical relay 130. Therefore, the electric power (charge) discharged from the capacitor 121 can be effectively utilized. Further, the above-described control efficiently executes the respective processes of failure diagnostics, capacitor discharging, and relay-contact cleaning, as illustrated in FIG. 3A. Therefore, the time required for the redundant power supply 120 to transition to the sleep state can be shortened in the present disclosure (FIG. 3A) as compared with the prior art (FIG. 3B).

Operations and Effects

As described above, according to the control device 123 according to the embodiment of the present disclosure, when the ignition of the vehicle is turned IGR-OFF, first, after the failure diagnostics of the redundant power supply 120 is performed, the discharge process of the capacitor 121 constituting the redundant power supply 120 is started, and the contact cleaning of the mechanical relay 130, that is, the fixation prevention process is performed in parallel during the discharge process.

By this control, the discharge process of the capacitor 121 and the contact cleaning process (fixation prevention process) of the mechanical relay 130 using the discharging power can be performed in parallel, so that the effective use of the electric power (charge) discharged from the capacitor 121 and the shortening of the discharging completion time of the capacitor 121 can be achieved.

Although an embodiment of the present disclosure has been described above, the present disclosure can be regarded as an in-vehicle power supply system including a control device, a control method executed by a control device including a processor and a memory, a control program for executing the control method, a computer-readable non-transitory storage medium storing the control program, and a control device.

The control device of the present disclosure can be used for an in-vehicle power supply system including a main power supply and a redundant power supply.

What is claimed is:

1. A vehicle comprising:
   a load;
   an in-vehicle power supply system including a main power supply, a redundant power supply, and a mechanical relay, the mechanical relay being configured to switch between a first connection state in which the main power supply and the load is connected and a second connection state in which the redundant power supply and the load is connected; and
   a body electronic control unit configured to control the mechanical relay to switch between the first connection state and the second connection state, wherein the redundant power supply includes
      a capacitor in series with the mechanical relay, the capacitor storing electric power;
      a semiconductor relay inserted between the capacitor and the mechanical relay and in series with the capacitor and the mechanical relay;
      a discharge circuit in parallel with the capacitor; and
      a control device, and
   the control device is configured to execute following processes in the order of (i) to (iii):
      (i) switching the discharge circuit to a discharge state to cause the capacitor to discharge electric power after ignition of the vehicle is turned off,
      (ii) controlling the semiconductor relay to be in a conductive state in response to the body electronic control unit controlling the mechanical relay to switch to the second connection state, and
      (iii) controlling the semiconductor relay to be in a non-conductive state until a predetermined time has passed.

* * * * *